United States Patent
May

[15] 3,693,914
[45] Sept. 26, 1972

[54] INFLATABLE CLOSURE

[72] Inventor: Gerald L. May, 1871 Canton Road, Akron, Ohio 44312

[22] Filed: Oct. 19, 1970

[21] Appl. No.: 81,793

[52] U.S. Cl. ...................................244/102 R, 49/477
[51] Int. Cl. ..............................................B64c 25/16
[58] Field of Search .........244/103 R, 102 R; 49/477; 114/201 A; 52/2

[56] References Cited

UNITED STATES PATENTS 3,100,918    8/1963    Coverley .....................49/477
3,410,508    11/1968   Fisher .....................244/102 R Primary Examiner—Milton Buchler
Assistant Examiner—Paul E. Sauberer
Attorney—John D. Haney

[57] ABSTRACT

An inflatable cover of fabric reinforced resilient elastomeric material having overlapping, flat walls in the deflated condition. A portion of one of the walls is fixedly attached to a support and upon inflation of the cover the fabric reinforced walls expand and swell around the attached portion drawing the other portions of the walls toward the attached portion to an uncovered condition in opposition to the resiliency of the elastomeric material which returns the walls to the covered flat condition upon deflation of the cover.

11 Claims, 6 Drawing Figures

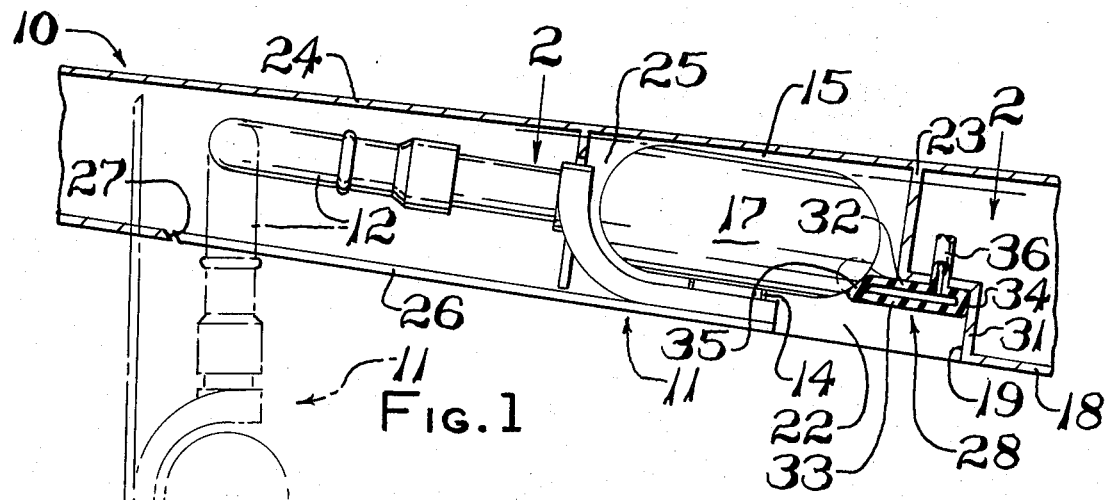
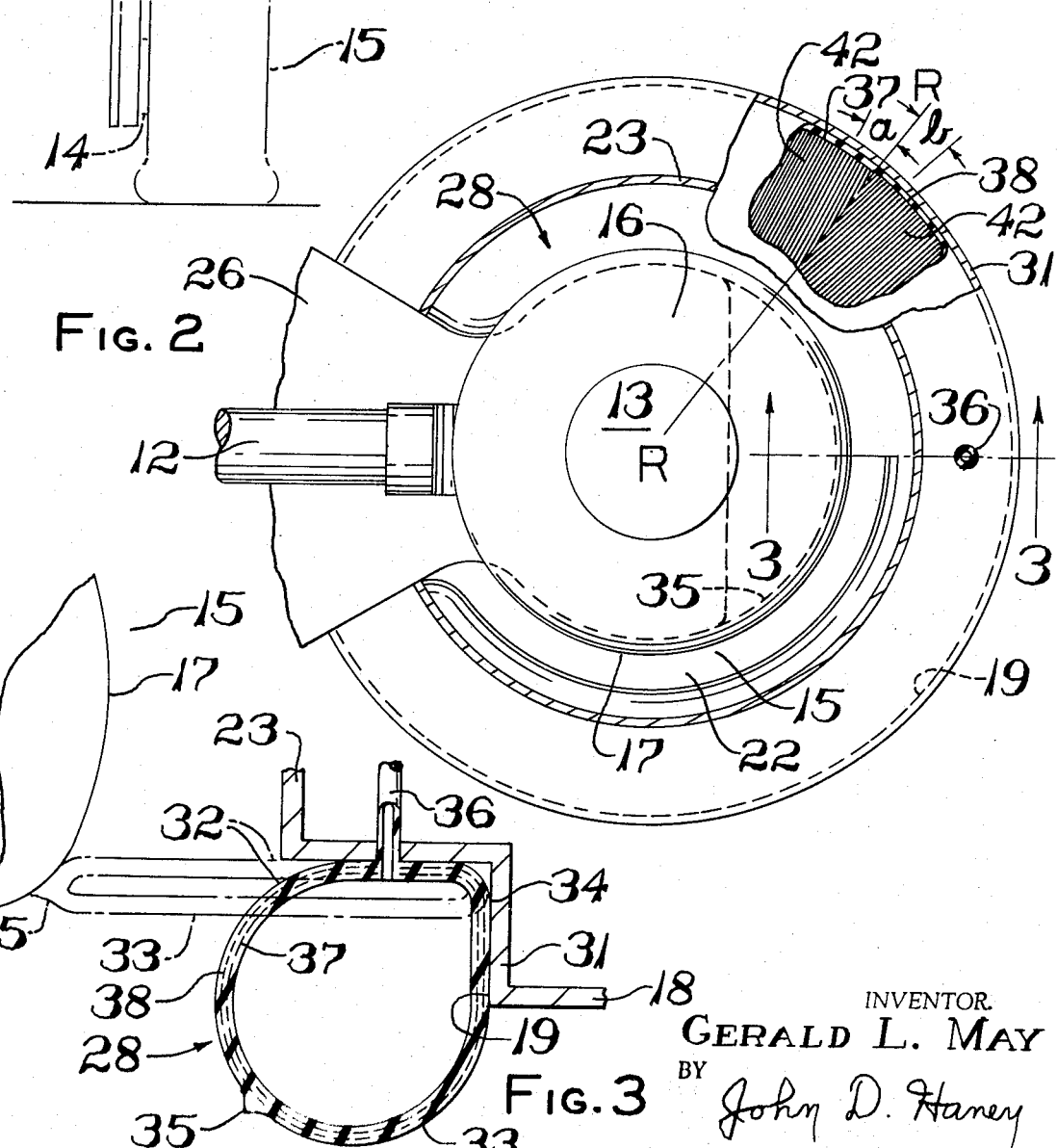
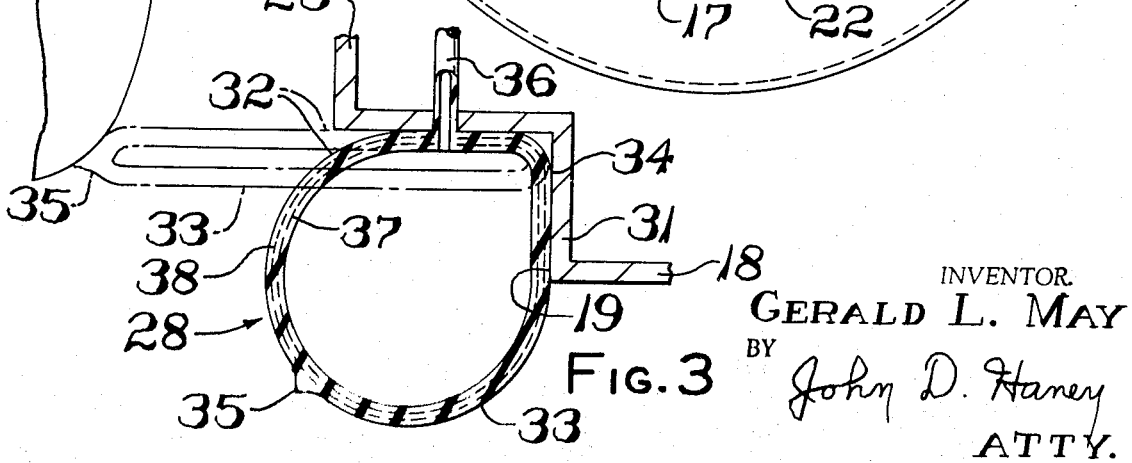

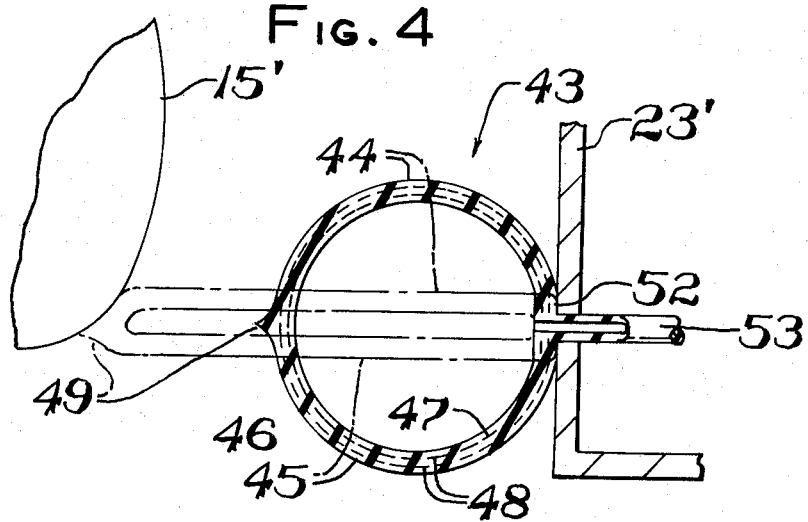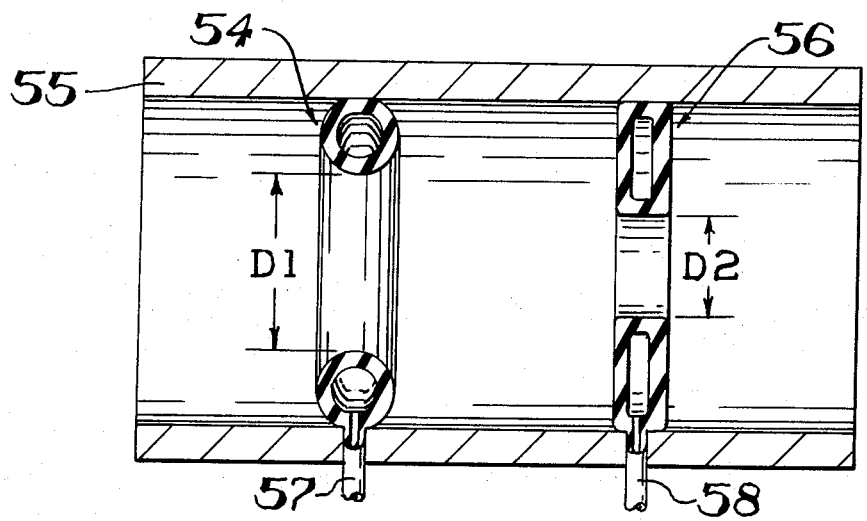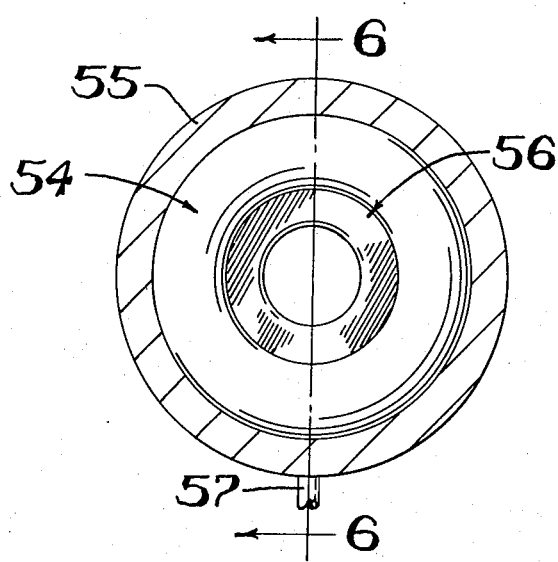

INFLATABLE CLOSURE

BACKGROUND OF THE INVENTION

This invention relates to an inflatable closure or seal which is especially adapted for closing the space between the wheel well and the tire of an aircraft landing gear for those aircraft which do not utilize a wheel well cover to house the landing gear system. A closure is needed on these aircraft to reduce the aerodynamic drag which results from such an opening in the aircraft. Many aircraft use a wheel well cover assembly; however, the extra weight of the cover assembly and the mechanism for operating this assembly makes such an apparatus undesirable for some aircraft. This is especially true of small lightweight aircraft where the weight and the cost of the equipment are comparatively great when the total weight of the aircraft and the total cost of the aircraft are considered.

An inflatable wheel well seal assembly which has been designed and used in the past is shown in U. S. Pat. No. 3,410,508 which is assigned to the assignee of this application. This seal has a series of segmental inflatable bags mounted on the wall of the wheel well and these bags are inflated into engagement with each other and with the tire to close the space between the wall of the wheel well and the tire. The bags are retracted by applying a vacuum which provides a clearance necessary for movement of the landing gear between the operating and stored positions.

One of the problems of a seal of this type is that pressure is required in the seal at all times to close the space between the wheel well and the tire. This puts a continual strain on the pressure system except when vacuum is applied to move the bags out of the way when the landing gear is being opened or retracted. Another undesirable characteristic of this type of inflatable closure is that if there is a pressure failure or a puncture of one of the air bags to cause loss of air pressure in the bags, the seal will be broken until a repair can be made. This is also true of inflatable closure where a tube is used instead of a number of individual bags.

SUMMARY OF THE INVENTION

The aircraft wheel well seal of this invention provides an inflatable closure in which the closure is inflated only when the wheel is to pass through. The seal is vulcanized in a flat shape with the inner edge having a diameter equal to substantially the diameter of the tire. Then in order to provide clearance for the wheel to move from the stored to the operating position, the closure is inflated and this draws the tire engaging edge radially outward towards the wheel well. Reinforcing cords adhered to and embedded in the walls of the inflatable closure control the stretching and contraction of the walls as well as strengthen the closure for maximum support during flight. The closure is constructed so that the inner diameter may be resiliently stretched and therefore in the event that the air pressure fails and the closure cannot be inflated, it is possible for the wheel to be forced through the closure even when deflated. Thus, if either the closure or the air pressure system fails, the wheel can be forced through the closure and the aircraft can be operated without costly shutdowns or repairs.

The closure of the invention is also of a simple construction providing for ease of manufacture and maintenance. The installation and removal of the closure may be accomplished with dispatch providing for minimum down time and requiring only ordinary skills of a mechanic.

The accompanying drawings show one preferred form and a modification of a closure seal applied to an aircraft wheel well seal and also a seal for a conduit made in accordance with and embodying this invention, all of which are representative of how this invention may be practiced.

BRIEF DESCRIPTION OF THE DRAWINGS

In the drawings:

FIG. 1 is a front elevation of a landing gear assembly and wheel well in an aircraft wing showing the landing gear in its extended position in dot-dash lines and in its retracted position in full lines.

FIG. 2 is a sectional view of the landing gear and wheel well taken along the plane of line 2—2 of FIG. 1 showing one-half of the seal in the inflated condition and the other half in the deflated condition, with parts being cut away to show the disposition of the reinforcing cords.

FIG. 3 is an enlarged sectional view taken along the plane of line 3—3 of FIG. 2 with the seal shown in the inflated condition in full lines and in the deflated condition in dot-dash lines, parts being broken away.

FIG. 4 is a sectional view like FIG. 3 of a modified form of seal, parts being broken away.

FIG. 5 is a sectional view of a passageway having closures embodying the invention mounted therein.

FIG. 6 is a sectional view taken along the plane of line 6—6 in FIG. 5 showing one closure in the inflated condition and the other closure in the deflated condition providing variable closures of the passageway.

DETAILED DESCRIPTION

An aircraft wing 10 is shown in FIG. 1 on which a landing gear assembly 11 is swingably mounted for movement between the retracted position shown in full lines and the dropped position shown in dot-dash lines. The landing gear assembly 11 has a strut 12 pivotally connected to the aircraft wing 10 for supporting a wheel 13, shown in FIG. 2, on an axle 14. The wheel 13 carries a tire 15 having a sidewall portion 16 and a tread portion 17.

The aircraft wing 10 has a bottom member of sheet metal or other suitable material 18 in which there is an opening 19 to a wheel well 22 having a wall or ring-shaped band 23 extending between the bottom member 18 and a top member 24 of the aircraft wing 10 to provide a cavity 25 in the wing for receiving the landing gear assembly 11 in the retracted condition. As shown in FIGS. 1 and 2, a sheet metal cowling 26 fits into an opening 27 in the bottom member 18 of the wing 10 for covering the strut 12 in the retracted condition of the landing gear assembly 11 and extends over the strut to partially cover the opening 19 in the bottom member 18.

A closure 28 is mounted on a substantially flat, circumferentially extending shoulder 31 on the band 23 and provides a fixed supporting member to which a substantially flat surface of the closure 28 may be fastened as by the use of suitable adhesives between the metal surface of the shoulder 31 and the elastomeric material such as rubber of the closure 28. The closure has overlapping walls 32 and 33 which are preferably vulcanized in a flat disc-shaped condition so that they extend from the band 23 to the tire tread portion 17 in the deflated condition. A radially outer edge 34 of the closure 28 abuts the band 23 and a radially inner edge 35 engages the tread portion 17 of the tire 15 in the deflated condition of the closure. The inner edge 35 may extend upward as well as radially inward, as shown in dotted lines in FIG. 1 in the deflated, unstressed condition so that upon installation in the aircraft there will be no sagging and a tighter seal between the tire and the closure will result.

A tubular member 36 extends through the shoulder 31 of the band 23 and into the wall 32 of the closure 28 for inflating and deflating the closure from a suitable source of air pressure and through suitable controls on the aircraft.

As shown more clearly in FIGS. 2 and 3, each of the overlapping walls 32 has overlapping plies 37 and 38 of reinforcing fabric cords 42 which may be of nylon, rayon or other textile material which is embedded in and adhered to the elastomeric material of the walls 32 and 33. These cords 42 preferably extend in a direction at an angle of at least 10° to the direction in which the walls move upon inflation of the closure. In the embodiment shown in FIG. 2, this is a radial direction indicated by line R—R and the angle of the cords 42 with this line R—R is indicated by letter *a* for the cords of one ply 37 and letter *b* for the cords of the other ply 38.

As shown in FIG. 3, the overlapping walls 32 and 33 expand and swell around the substantially flat surface of the shoulder 31 of the band 23 to which the walls are adhered upon inflation and this draws the radially inner edge 35 of the closure radially outward in opposition to the resiliency of the elastomeric material of the closure. The cords 42 control the expansion of the walls 32 and 33 and pantograph to hold the walls in the desired locked, inflated condition. As shown in FIG. 3, the opening between the tire 15 and the wheel well band 23 will be uncovered to provide clearance for movement of the landing gear assembly 11 between the retracted position and the dropped position shown in FIG. 1 upon inflation of the closure 28. This clearance is also shown in the bottom half of FIG. 2.

To return the inner edge 35 to a position in engagement with the tire as shown in FIG. 3, the closure 28 is deflated whereupon the resiliency of the elastomeric material of the closure urges the walls 32 and 33 radially inward and against the tire 15. The cords 42 of the overlapping plies 37 and 38 adjust accordingly to permit this return to the flat condition covering the space between the band 23 and tire 15.

A modified closure 43 is shown in FIG. 4 mounted on a band 23' of a wheel well containing a tire 15'. The closure 43 has walls 44 and 45 shown in the inflated condition in full lines and in the deflated condition in dot-dash lines. These walls 44 and 45 are of resilient elastomeric material having overlapping plies 46 and 47 of textile material embedded therein and adhered thereto with cords 48 extending at an angle of at least 10° to the radial direction of the wheel well in the deflated condition of the closure. The radially inner edge 49 of the closure 43 engages the tire 15' while a radially outer edge 52 of the closure is fastened to the wall 23' by a suitable adhesive between the metal of the wall and the elastomeric material of the closure. A tubular member 53 extending through the wall 23' and into the space between the walls 44 and 45 of the closure provides for deflation and inflation of this closure. Upon inflation of the closure, the walls 44 and 45 swell and expand around the fixed edge 52 moving the radially inner edge 49 away from the tire 15' and providing the necessary clearance for raising and lowering the landing gear assembly 11. The cords 48 pantograph and control the expansion as well as the contraction of the walls 44 and 45 of the closure 43. Upon deflation of the closure 43, the resiliency of the elastomeric material of the walls returns the radially inner edge 49 to a position in engagement with the tire 15'.

A further modification is shown in FIG. 5 and FIG. 6 in which a closure 54 is mounted in a cylindrical conduit 55 as by a suitable adhesive between the closure and the walls of the cylindrical conduit. A second closure 56 is mounted in the conduit at a spaced-apart position from the first closure 54 to show the relative conditions of the closures in the inflated and deflated condition. These closures 54 and 56 are of elastomeric material such as rubber which may be reinforced with plies of textile material embedded therein and adhered thereto with the cords extending at an angle to the radial direction. Tubular members 57 and 58 are provided to inflate and deflate these closures. By inflating or deflating the closures 54 and 56 the diameter of the conduit can be changed from a maximum indicated by "D1" to a minimum diameter indicated by "D2" as shown in FIG. 6.

While certain representative embodiments and details have been shown for the purpose of illustrating the invention, it will be apparent to those skilled in the art that various changes and modifications may be made therein without departing from the spirit or scope of the invention.

I claim:

1. An inflatable closure comprising a hollow body of resilient elastomeric material having overlapping, substantially flat covering walls in the deflated condition of said body, an attached portion of said walls being mounted on a relatively fixed supporting member whereby said walls expand into a curved shape around said attached portion and are drawn toward said attached portion into an uncovered position in opposition to the resiliency of said elastomeric material during inflation of said hollow body and whereby the resiliency of said elastomeric material returns said walls to the flat covering condition upon deflation of said body.

2. An inflatable closure according to claim 1 wherein said walls have a movable edge portion spaced from said attached portion and said movable edge portion is supported only by the resiliency of said elastomeric material whereby it may be drawn towards said attached portion of said wall during inflation and be displaced by an object engaging said movable edge portion during deflation of said body.

3. An inflatable closure according to claim 1 wherein reinforcing cords are embedded in and adhered to the elastomeric material of said body for controlling the stretching and contraction of said walls during deflation and inflation of said body.

4. An inflatable closure according to claim 3 wherein said cords are disposed at an angle of at least 10° to the direction in which the walls move during inflation to limit expansion of said body and control the movement thereof.

5. An inflatable closure according to claim 4 wherein each of said overlapping walls has two plies of woven fabric with the cords of one ply at an angle of at least 20° to the cords of the other ply for controlling the stretching and movement of said walls.

6. An inflatable closure according to claim 1 wherein said attached portion of said walls has a flat surface fastened to a substantially flat surface of said fixed supporting member whereby said walls expand into a curved shape around said flat surface of said attaChed portion and with said walls extending outward from said flat surface.

7. An inflatable closure according to claim 1 wherein said attached portion of said walls is at a fixed edge portion of said hollow body and is mounted on said fixed supporting member whereby said walls expand into a curved shape around said edge portion.

8. An inflatable closure for closing the space between a wheel well and an aircraft tire comprising a hollow body of resilient elastomeric material having overlapping, substantially flat covering walls in the deflated condition of said body for attachment to the wheel well, an outer portion of said walls being mounted on a relatively fixed supporting member of said wheel well, an inner portion of said walls extending radially inward into engagement with the tread of said tire, means to inflate said hollow body whereby said walls expand radially outward into a curved shape around said outer portion of said walls and away from said tire and means for deflating said body whereby the resiliency of said elastomeric material returns said inner portion of said walls to the flat covering condition in engagement with said tire to close the space between said wheel well and said tire.

9. An inflatable closure according to claim 8 wherein said outer portion of said walls has a substantially flat, circumferential surface fastened to a substantially flat surface of said supporting member whereby said walls expand into a curved shape around said flat surface and wherein reinforcing cords are embedded in and adhered to the elastomeric material of said body and said cords extend at an angle of at least 10° to the radial direction of said wheel well in the deflated condition of said body.

10. An inflatable closure according to claim 8 wherein reinforcing cords are embedded in and adhered to the elastomeric material of said body and said cords extend at an angle of at least 10° to the radial direction of said wheel well in the deflated condition of said body and wherein said outer portion of said walls is at a radially outward edge portion mounted on said wheel well whereby said walls expand into a curved shape around said edge portion and are drawn toward said edge portion into an uncovered position away from said tire in opposition to the resiliency of said elastomeric material during inflation of said hollow body.

11. An inflatable closure according to claim 8 wherein said hollow body has a substantially annular shape with said walls extending radially outward from said tire to said wheel well and the inner edge of said walls extending upward as well as inward in the deflated condition to provide a better sealing action against said tire and compensate for the weight of said body tending to pull said radially inward edge downward away from said tire.

* * * * *

UNITED STATES PATENT OFFICE
CERTIFICATE OF CORRECTION

Patent No. 3,693,914                Dated September 26, 1972

Inventor(s)   GERALD L. MAY

It is certified that error appears in the above-identified patent and that said Letters Patent are hereby corrected as shown below:

Please show that this patent has been assigned to

The B.F.Goodrich Company, New York, N.Y. -- .

Signed and sealed this 8th day of May 1973.

(SEAL)
Attest:

EDWARD M.FLETCHER,JR.         ROBERT GOTTSCHALK
Attesting Officer             Commissioner of Patents